US012609096B2

(12) United States Patent
Tokunaga et al.

(10) Patent No.: US 12,609,096 B2
(45) Date of Patent: Apr. 21, 2026

(54) COVER

(71) Applicant: Sumitomo Riko Company Limited, Aichi (JP)

(72) Inventors: Takuya Tokunaga, Aichi (JP); Kenichiro Ito, Aichi (JP); Hiroyuki Kondo, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 257 days.

(21) Appl. No.: 18/500,119

(22) Filed: Nov. 2, 2023

(65) Prior Publication Data

US 2024/0212662 A1 Jun. 27, 2024

Related U.S. Application Data

(63) Continuation of application No. PCT/JP2022/048223, filed on Dec. 27, 2022.

(51) Int. Cl.
*G10K 11/162* (2006.01)

(52) U.S. Cl.
CPC .................................. *G10K 11/162* (2013.01)

(58) Field of Classification Search
CPC .................................................... G10K 11/162
See application file for complete search history.

(56) References Cited

U.S. PATENT DOCUMENTS 3,942,750 A * 3/1976 Noorily .................. H02G 3/266 248/74.3
4,507,828 A * 4/1985 Furutsu .............. B65D 63/1063 24/17 AP
8,408,356 B2 * 4/2013 Yamaguchi ........ H05K 7/20736 181/216
10,961,750 B2 * 3/2021 Kondo .................... E05B 85/02
(Continued)

FOREIGN PATENT DOCUMENTS

JP 2019068722 4/2019
JP 2020205732 12/2020
(Continued)

OTHER PUBLICATIONS

"International Search Report (Form PCT/ISA/210) of PCT/JP2022/048223", mailed on Mar. 14, 2023, with English translation thereof, pp. 1-7.

(Continued)

*Primary Examiner* — Forrest M Phillips
(74) *Attorney, Agent, or Firm* — JCIPRNET

(57) ABSTRACT

A cover includes: divided covers, made of an elastomer; a first locking part, integrally formed on an edge of one divided cover; and a second locking part, integrally formed on an edge of the other divided cover. The first locking part includes a base end piece and a tip piece, and has a locking groove opening on a side opposite to an abutment direction formed between the base end piece and the tip piece. The second locking part includes a notch and a bridge. An insertion hole communicating with the notch is formed
(Continued)

inside the bridge. By inserting the tip piece and the base end piece through the insertion hole and locking the bridge to the locking groove, the first locking part is locked to the second locking part while being prevented from coming off.

8 Claims, 6 Drawing Sheets

(56) References Cited

U.S. PATENT DOCUMENTS

2006/0265840 A1* 11/2006 Thompson ............... H02G 3/30
24/16 PB
2007/0101551 A1* 5/2007 Thompson ......... B65D 63/1072
24/16 PB
2008/0271943 A1* 11/2008 Provessi ............. F04B 39/0072
181/212
2010/0331750 A1* 12/2010 Ingimundarson ..... A61F 5/0102
602/26
2022/0085688 A1* 3/2022 Riederer ................. B32B 27/32
2022/0267056 A1* 8/2022 Morris ................. B65D 43/164

FOREIGN PATENT DOCUMENTS

JP 2022514609 2/2022
JP 2022169191 11/2022

OTHER PUBLICATIONS

"Written Opinion of the International Searching Authority (Form PCT/ISA/237) of PCT/JP2022/048223", mailed on Mar. 14, 2023, with English translation thereof, pp. 1-8.

* cited by examiner

COVER

CROSS-REFERENCE TO RELATED APPLICATION

This application is a continuation of PCT International Application No. PCT/JP2022/048223, filed on Dec. 27, 2022. The entirety of the above-mentioned patent application is hereby incorporated by reference herein and made a part of this specification.

BACKGROUND

Technical Field

The present disclosure relates to a cover for covering an object.

Related Art

A cover that covers an object is provided for purposes of protecting the object, preventing sound generated from the object from escaping to the outside, and suppressing vibration generated from the object.

For example, Japanese Translation of PCT International Application Publication No. 2022-514609 (Patent Document 1) discloses a device (cover) for sound insulation of machinery. The cover has a sound absorbing composite material wall including a plastic carrier layer, is wound around a motor serving as an object and has both ends joined to each other to thereby form a sleeve. At one of the ends, an insertion tab having a locking recess on a lower surface is formed. At the other end, a storage element having a passage for receiving the insertion tab is formed, and an insertion connection mechanism is formed. When the insertion tab is inserted into the passage, an upper surface of the insertion tab is locked to a presser bracket provided on the storage element. At the same time, a locking protrusion provided on the storage element is locked to the locking recess in the lower surface of the insertion tab. Thus, even if the motor is not provided with a fastening member for the cover, the ends can be connected to make it possible to cover the motor.

Japanese Patent Laid-open No. 2019-68722 (Patent Document 2) discloses a cover unit made of an elastomer that covers an object such as a motor or an engine. The cover unit is divided into two, that is, a first divided cover and a second divided cover. A first locking part of the first divided cover and a second locking part of the second divided cover are locked to each other and assembled. A protruding main piece is formed in the first locking part. A main hole allowing the main piece to be inserted therethrough is formed in the second locking part. While the main piece is inserted through the main hole, the main piece is prevented from coming off by a main claw provided on the main piece. Thus, the two divided covers may be assembled even if the object is not provided with a fastening member.

In the case of a structure in which a locking protrusion is locked to a locking recess to prevent coming-off, as in Patent Document 1, if the cover is made of a resin material with relatively low hardness, such as an elastomer, there is a risk that the mutual locking may be accidentally released due to an external impact or the like. This also applies to a claw-based retaining structure such as that described in Patent Document 2, and a covering state by the cover is insufficient in reliability. In both of Patent Documents 1 and 2, the retaining structure is complex, and an increase in cost is unavoidable.

SUMMARY

A cover includes: a cover body, made of an elastomer and having a pair of edges facing each other; a first locking part, integrally formed on one of the edges; and a second locking part, integrally formed on the other of the edges. The cover is able to cover an object by locking the first locking part and the second locking part to each other with the edges facing each other abutted against each other. The first locking part includes a base end piece protruding in an abutment direction from the one of the edges to the other of the edges and a tip piece protruding in the abutment direction from a protruding end of the base end piece, and has a locking groove opening on a side opposite to the abutment direction formed between the base end piece and the tip piece. The second locking part includes a notch formed in the abutment direction from the other of the edges, and a bridge formed along the other of the edges so as to straddle the notch on an outer surface side of the cover body. An insertion hole communicating with the notch is formed inside the bridge. By inserting the tip piece and the base end piece through the insertion hole and locking the bridge to the locking groove, the first locking part is locked to the second locking part while being prevented from coming off.

DESCRIPTION OF THE EMBODIMENTS

Figure 1:
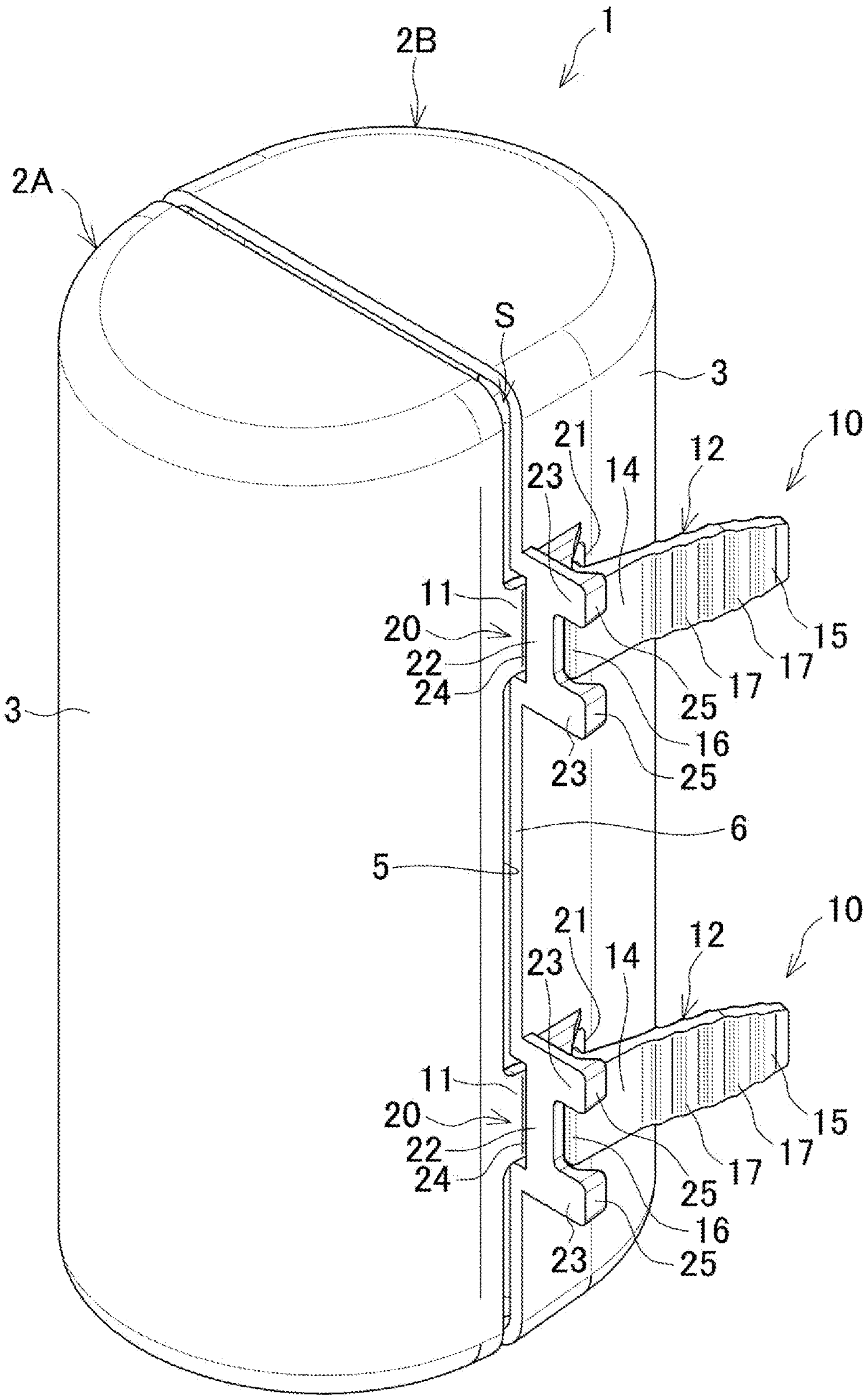
FIG. 1 is a perspective view of a cover.

The present disclosure provides a cover which is of a simple structure, is able to suitably maintain a state of covering an object even if made of an elastomer, and is highly reliable.

The present disclosure provides a cover. The cover includes: a cover body, made of an elastomer and having a pair of edges facing each other; a first locking part, integrally formed on one of the edges; and a second locking part, integrally formed on the other of the edges. The cover is able to cover an object by locking the first locking part and the second locking part to each other with the edges facing each other abutted against each other. The first locking part includes a base end piece protruding in an abutment direction from the one of the edges to the other of the edges and a tip piece protruding in the abutment direction from a protruding end of the base end piece, and has a locking groove opening on a side opposite to the abutment direction formed between the base end piece and the tip piece. The second locking part includes a notch formed in the abutment direction from the other of the edges, and a bridge formed along the other of the edges so as to straddle the notch on an outer surface side of the cover body. An insertion hole communicating with the notch is formed inside the bridge. By inserting the tip piece and the base end piece through the insertion hole and locking the bridge to the locking groove, the first locking part is locked to the second locking part while being prevented from coming off.

In another aspect of the present disclosure, in the above configuration, the tip piece includes a locking plate connected to the base end piece and a tip plate connected to the locking plate. The locking plate includes, at an end opposite to the abutment direction, a protruding portion that forms the locking groove between itself and the base end piece. The tip plate is connected to the locking plate while being inclined outward at a predetermined inclination angle in a direction intersecting the abutment direction.

In another aspect of the present disclosure, in the above configuration, the inclination angle of the tip plate with respect to the locking plate is 5° to 30°.

In another aspect of the present disclosure, in the above configuration, a ridge is formed on at least one of an outer surface and an inner surface of the tip plate.

In another aspect of the present disclosure, in the above configuration, the bridge is arranged in a position spaced outward from the outer surface of the cover body.

In another aspect of the present disclosure, in the above configuration, a protrusion protruding outward is provided on an outer surface of the bridge.

In another aspect of the present disclosure, in the above configuration, a distance from the outer surface of the cover body to a protruding end of the tip piece in a direction intersecting the abutment direction is equal to or less than a distance from the outer surface of the cover body to a tip of the protrusion in the direction intersecting the abutment direction.

In another aspect of the present disclosure, in the above configuration, a sound absorbing material formed from foamed resin is arranged on at least a portion of an inner surface of the cover body.

In another aspect of the present disclosure, in the above configuration, the sound absorbing material is also arranged on at least a portion of the outer surface of the cover body.

According to the present disclosure, a simple structure is provided, and a state of covering the object can be suitably maintained even if an elastomer is used as a material. Thus, a highly reliable cover can be provided.

According to another aspect of the present disclosure, in addition to the above effects, since the locking plate includes the protruding portion at the end opposite to the abutment direction and the tip plate is inclined outward at the predetermined angle in the direction intersecting the abutment direction, a locked state of the bridge locked to the locking groove can be suitably maintained by the protruding portion. Since the tip plate is inclined outward, locking and releasing operations of the first locking part and the second locking part are facilitated.

According to another aspect of the present disclosure, in addition to the above effects, since the inclination angle of the tip plate with respect to the locking plate is 5° to 30°, the tip plate does not excessively protrude from the cover, and an angle that facilitates the locking and releasing operations is formed.

According to another aspect of the present disclosure, in addition to the above effects, since the ridge is formed on at least one of the outer surface and the inner surface of the tip plate, the ridge serves as a non-slip when the tip plate is grasped, and operation is facilitated.

According to another aspect of the present disclosure, in addition to the above effects, since the bridge is arranged in the position spaced outward from the outer surface of the cover body, the tip piece of the first locking part is easily inserted into the inside of the bridge.

According to another aspect of the present disclosure, in addition to the above effects, since the protrusion is provided on the outer surface of the bridge, when the cover is removed, the bridge can be elastically deformed in a direction away from the locking groove using the protrusion, and the locking and releasing operations of the first locking part and the second locking part are easily performed.

According to another aspect of the present disclosure, in addition to the above effects, since the distance from the outer surface of the cover body to the protruding end of the tip piece in the direction intersecting the abutment direction is equal to or less than the distance from the outer surface of the cover body to the tip of the protrusion in the direction intersecting the abutment direction, the tip plate is less likely to hinder an operation of the protrusion.

According to another aspect of the present disclosure, in addition to the above effects, since the sound absorbing material formed from foamed resin is arranged on at least a portion of the inner surface of the cover body, a sound insulation effect when covering the object is enhanced.

According to another aspect of the present disclosure, in addition to the above effects, if the sound absorbing material is also arranged on at least a portion of the outer surface of the cover body, a relatively good sound insulation effect may be achieved.

Hereinafter, an embodiment of the present disclosure is described based on the drawings.

Figure 2:
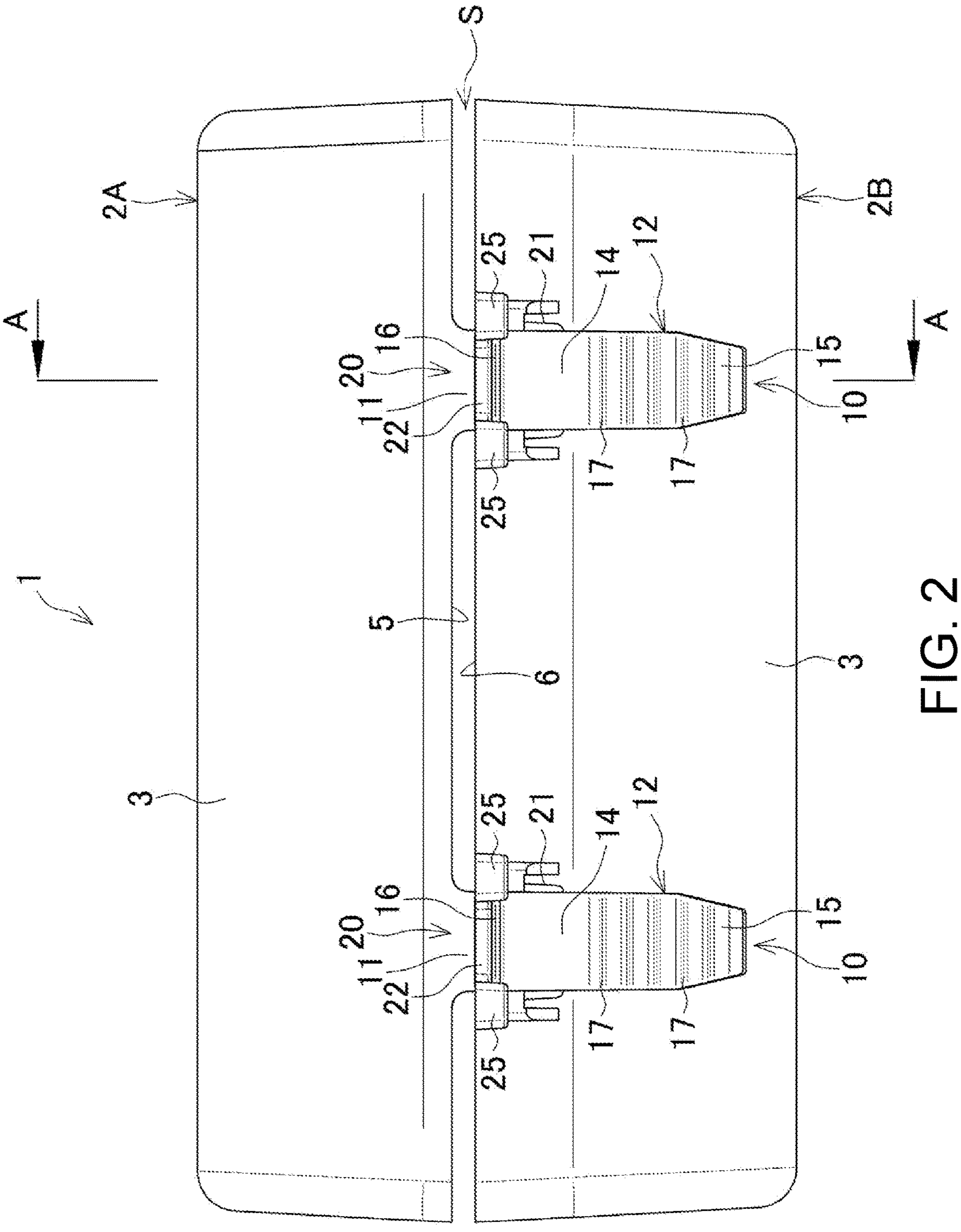
FIG. 2 is a side view of the cover.
Figure 3:
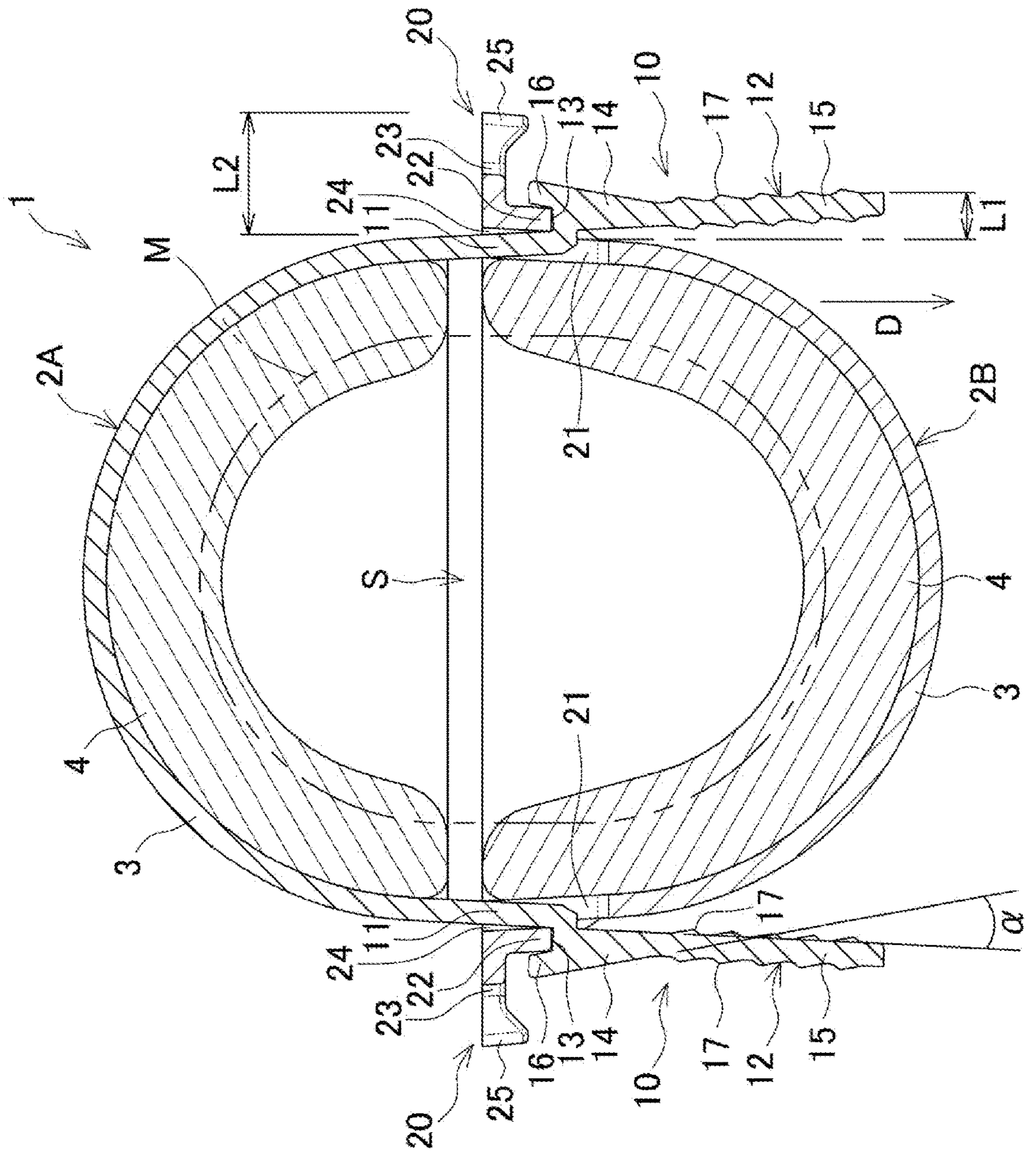
FIG. 3 is a cross-sectional view taken on line A-A in FIG. 2.

FIG. 1 is a perspective view showing an example of a cover. FIG. 2 is a side view of the cover. FIG. 3 is a cross-sectional view taken on line A-A in FIG. 2. A cover 1 is of a cylindrical shape as a whole. Both axial ends of the cylindrical shape are closed. The cover 1 is formed by joining a pair of divided covers 2A and 2B of a semi-cylindrical shape. The divided covers 2A and 2B are an example of a cover body of the present disclosure.

The divided covers 2A and 2B each have a two-layer structure including an outer layer 3 and an inner layer 4. The outer layer 3 is made of an elastomer. The inner layer 4 is made of urethane foam. The elastomer has a hardness of, for example, 90 to 95 Shore A. Urethane foam is an example of a sound absorbing material formed from foamed resin of the present disclosure. However, at both axial ends of the cylindrical shape, there is no inner layer 4 and only the outer layer 3 is formed.

The cover 1 is used to cover an object M indicated by a two-dot chain line in FIG. 3 in order to protect the object M and to prevent sound generated from the object M from escaping to the outside. The object M is, for example, a motor. While the object M is covered, the inner layer 4 elastically deforms and holds the object M.

Figure 4:
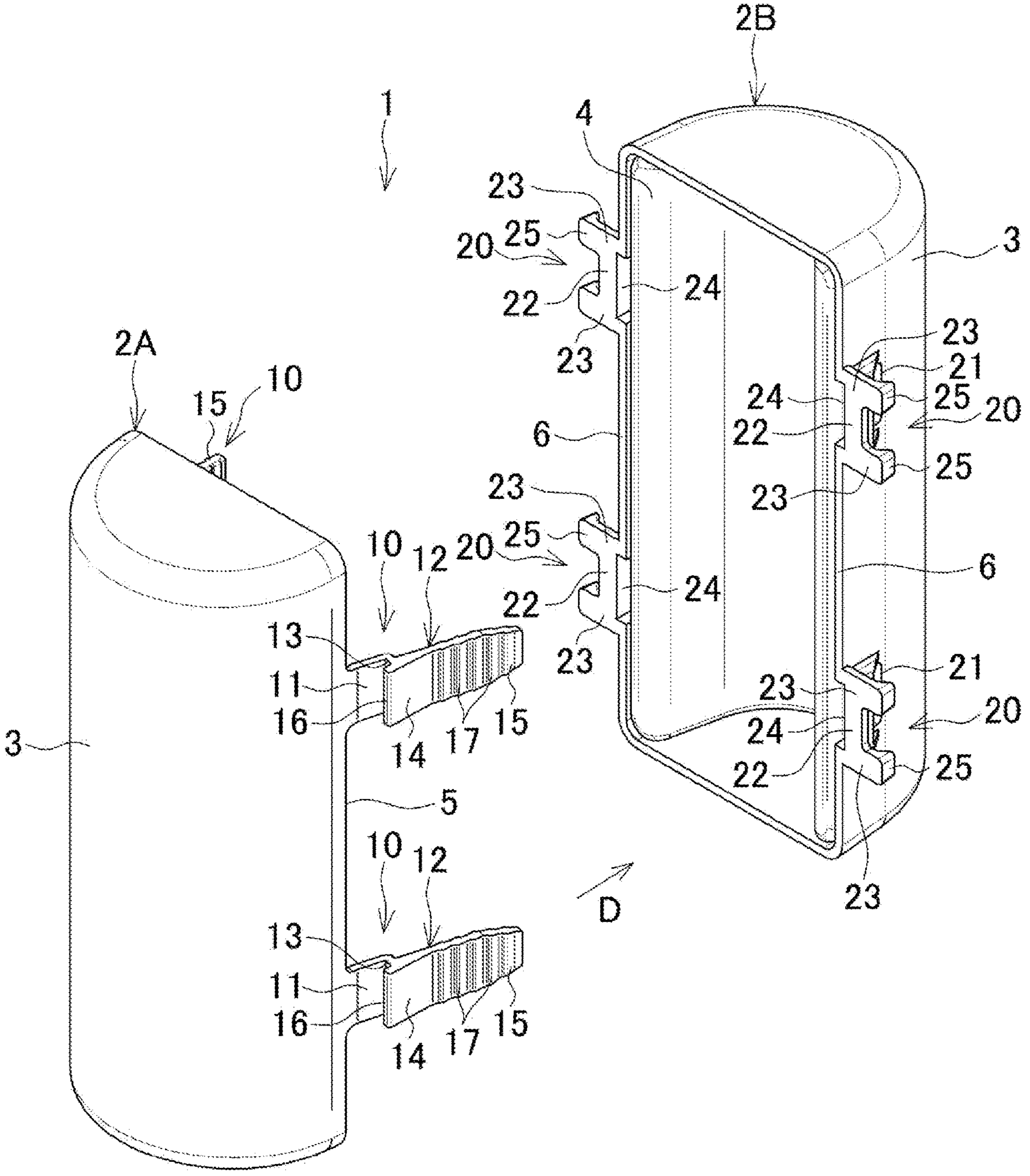
FIG. 4 is an exploded perspective view of the cover seen from one divided cover side.
Figure 5:
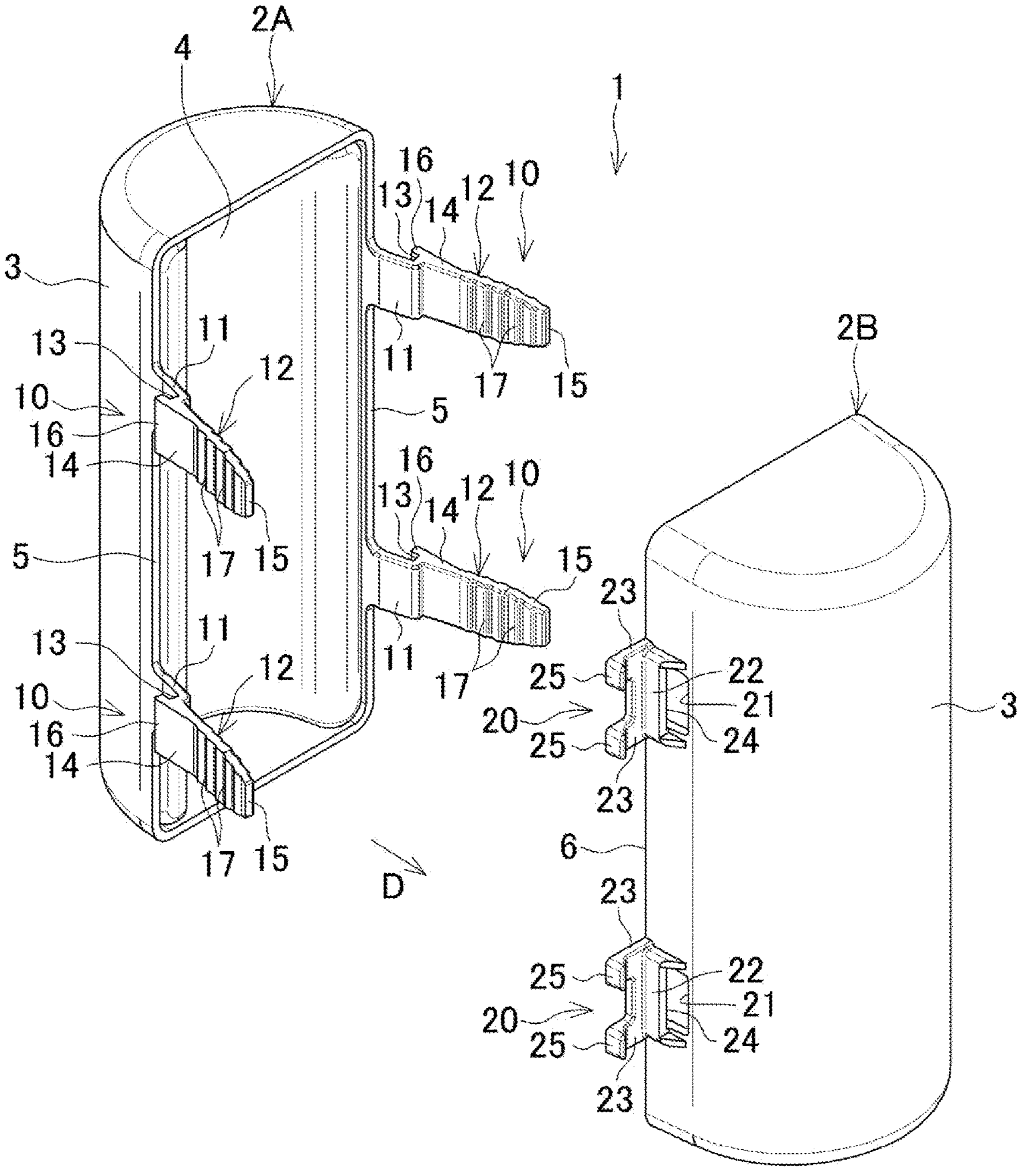
FIG. 5 is an exploded perspective view of the cover seen from the other divided cover side.

As shown in FIG. 4 and FIG. 5 as well, in the outer layer 3 of one divided cover 2A, a pair of first locking parts 10, 10 are integrally provided on each of both edges 5, 5 extending in a longitudinal direction.

In the outer layer 3 of the other divided cover 2B, a pair of second locking parts 20, 20 are integrally provided on both edges 6, 6 extending in the longitudinal direction. When both edges 5 of the divided cover 2A and both edges 6 of the divided cover 2B are abutted against each other, each first locking part 10 and each second locking part 20 face each other. By locking the facing first locking part 10 and second locking part 20 to each other, the divided covers 2A and 2B are joined.

The first locking part 10 includes a base end piece 11, a tip piece 12 and a locking groove 13. The base end piece 11 is of a strip shape protruding from the edge 5 of the outer layer 3 of the divided cover 2A in an abutment direction with the second locking part 20. The tip piece 12 is integrally formed at a protruding end of the base end piece 11 and is of a strip shape protruding further than the base end piece 11 in the abutment direction. Arrow D shown in FIG. 3, FIG. 4, and FIG. 5 is the abutment direction.

The tip piece 12 includes a locking plate 14 and a tip plate 15. The locking plate 14 is connected to the base end piece 11 and is of a plate shape protruding in the abutment direction D. In the locking plate 14, a protruding piece 16 is formed protruding toward a side opposite to the abutment direction D. The protruding piece 16 is an example of a protruding portion of the present disclosure.

The locking groove 13 is formed between the base end piece 11 and the protruding piece 16. The locking groove 13 opens on the side opposite to the abutment direction D.

The tip plate 15 is of a plate shape and connected to the locking plate 14. However, as shown in FIG. 3, the tip plate 15 is inclined outward at a predetermined angle with respect to the locking plate 14 in a direction intersecting the abutment direction D. This inclination angle $\alpha$ is, for example, 12°. The inclination angle $\alpha$ is not limited to 12°, and can be set between 5° and 30°. Thus, the tip plate 15 protrudes in an inclination direction away from the outer layer 3 toward the abutment direction D side. As shown in FIG. 3, a protruding end of the tip piece 12 is spaced apart from an extended surface of the outer layer 3 by a distance L1 in a direction orthogonal to the abutment direction D.

A plurality of ridges each denoted by the numeral 17 are formed on both sides of the tip plate 15 in a thickness direction. The ridges 17 extend in a width direction of the tip plate 15, and are formed at equal intervals in a direction in which the tip plate 15 protrudes.

The second locking part 20 includes a notch 21, a bridge 22, and a protrusion 23. The notch 21 is formed by cutting out the edge 6 of the outer layer 3 of the divided cover 2B toward the abutment direction D.

The bridge 22 extends in a band shape along the edge 6 so as to straddle the notch 21 outside the outer layer 3. Thus, an insertion hole 24 that communicates with the notch 21 and extends along the edge 6 is formed inside the bridge 22. A length of the insertion hole 24 in a direction along the edge 6 is slightly larger than a width of the base end piece 11 and the tip piece 12 of the first locking part 10.

The protrusion 23 protrudes outward from an outer surface on both sides of the bridge 22 that sandwich the notch 21. A head 25 protruding in the abutment direction D is formed at each protruding end of the protrusion 23.

Here, as shown in FIG. 3, the protruding end of the protrusion 23 is spaced apart from the outer layer 3 of the divided cover 2B by a distance L2 in the direction orthogonal to the abutment direction D. The distance L2 to the tip of the protrusion 23 is larger than the distance L1 being a separation distance of the protruding end of the tip piece 12 described above.

When the cover 1 configured as above is used, first, half of the object M is covered with one of the divided covers 2A and 2B. In this state, while the other half of the object M is covered with the other of the divided covers 2A and 2B, each first locking part 10 and each second locking part 20 facing each other are locked. Specifically, with the tip piece 12 of the first locking part 10 inserted into the insertion hole 24 of the second locking part 20, the base end piece 11 is inserted until the protruding piece 16 passes through the bridge 22. After the protruding piece 16 passes through the bridge 22, the bridge 22 is elastically locked to the locking groove 13. Then, as shown in FIG. 1 to FIG. 3, the first locking part 10 is prevented from coming off by the second locking part 20, the first locking part 10 and the second locking part 20 are locked to each other, and the object M is covered by the divided covers 2A and 2B.

In this way, since the bridge 22 is elastically locked to the locking groove 13 and the first locking part 10 is prevented from coming off, the risk of accidental release of mutual locking due to an external impact or the like is reduced. In particular, since the protruding piece 16 is located outside the bridge 22, the bridge 22 is relatively unlikely to come off from the locking groove 13.

A gap S is formed between the divided covers 2A and 2B in the state in which the object M is covered. Thus, it is possible to pull out, from the gap S, a cable or the like connected to the object M.

Figure 6:
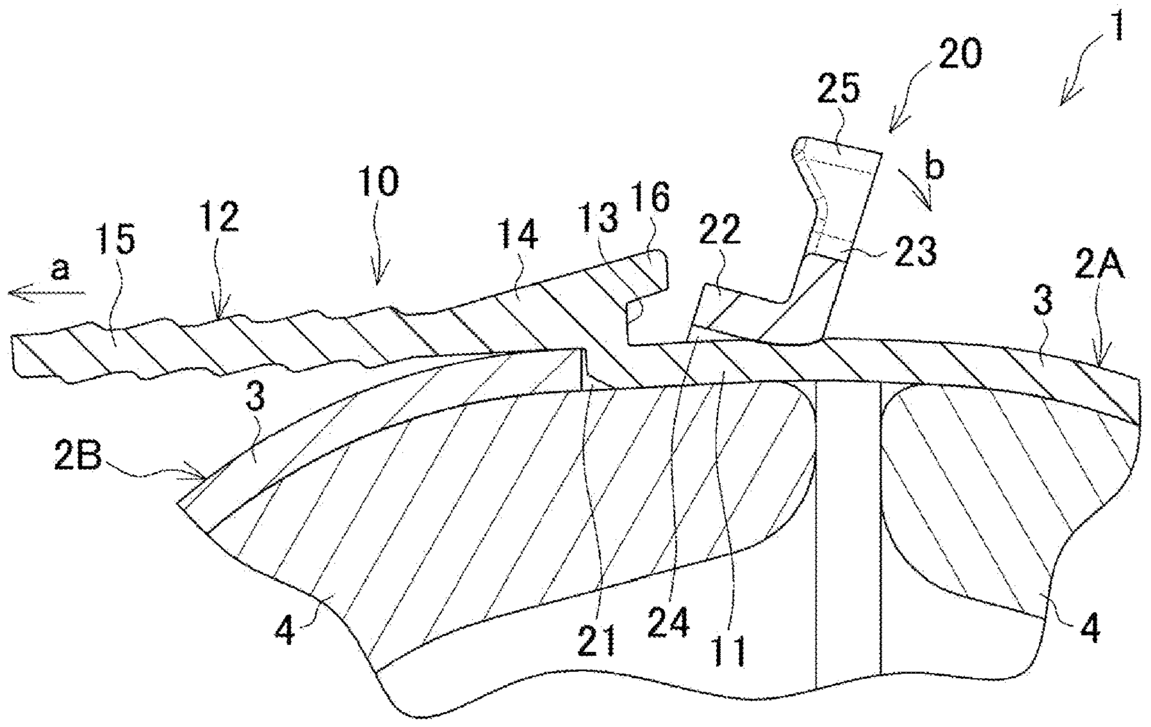
FIG. 6 is an explanatory diagram showing a state of a first locking part and a second locking part when the cover is removed.

On the other hand, in the case of removing the cover 1 from the object M, the tip plate 15 of the tip piece 12 of the first locking part 10 is grasped and is pulled so as to fall toward the divided cover 2B side, as indicated by arrow a in FIG. 6. Then, the locking groove 13 can be separated from the bridge 22, and the retainment can be released. At this time, as indicated by arrow b, the protrusions 23, 23 of the second locking part 20 fall toward the divided cover 2A side via the heads 25, 25. Then, the bridge 22 elastically moves toward the divided cover 2A side together with the protrusions 23, 23. Thus, the bridge 22 can be easily separated from the locking groove 13.

After the locking groove 13 is separated from the bridge 22, the locking plate 14 is passed through the insertion hole 24 from the inside of the bridge 22 together with the protruding piece 16 and is pulled out from the second locking part 20. Subsequently, the tip plate 15 is also passed through the insertion hole 24 from the inside of the bridge 22 and is pulled out from the second locking part 20. If the locking between each first locking part 10 and each second locking part 20 is released in this way, the divided covers 2A and 2B can be removed from the object M.

In this way, the cover 1 of the above embodiment includes: the divided covers 2A and 2B, made of an elastomer and respectively having a pair of edges 5, 5 and a pair of edges 6, 6 facing each other; the first locking part 10, integrally formed on one edge 5; and the second locking part 20, integrally formed on the other edge 6. By locking the first locking part 10 and the second locking part 20 to each other with the facing edges 5 and 6 abutted against each other, it is possible to cover the object M.

The first locking part 10 includes the base end piece 11 protruding in the abutment direction D from the edge 5 to the edge 6 and the tip piece 12 protruding in the abutment direction D from the protruding end of the base end piece 11. The locking groove 13 opening on the side opposite to the abutment direction D is formed between the base end piece 11 and the tip piece 12.

The second locking part 20 includes the notch 21 formed in the abutment direction D from the edge 6, and the bridge 22 formed along the edge 6 so as to straddle the notch 21 on the outer surface side of the divided cover 2B. The insertion hole 24 communicating with the notch 21 is formed inside the bridge 22.

By inserting the tip piece 12 and the base end piece 11 through the insertion hole 24 and locking the bridge 22 to the locking groove 13, the first locking part 10 is locked to the second locking part 20 while being prevented from coming off.

According to this configuration, a simple structure is provided, and a state of covering the object M can be suitably maintained even if an elastomer is used as a material. Thus, the cover 1 with high reliability can be provided.

The tip piece 12 includes the locking plate 14 connected to the base end piece 11 and the tip plate 15 connected to the locking plate 14. The locking plate 14 includes, at an end opposite to the abutment direction D, the protruding piece 16 that forms the locking groove 13 between itself and the base end piece 11. On the other hand, the tip plate 15 is connected to the locking plate 14 while being inclined outward at the predetermined inclination angle α in the direction intersecting the abutment direction D.

Thus, by the protruding piece 16, a locked state of the bridge 22 locked to the locking groove 13 can be suitably maintained. Since the tip plate 15 is inclined outward, locking and releasing operations of the first locking part 10 and the second locking part 20 are facilitated.

The inclination angle of the tip plate 15 with respect to the locking plate 14 is 5° to 30°.

Thus, the tip plate 15 does not excessively protrude from the cover 1, and an angle that facilitates the locking and releasing operations is formed.

The ridge 17 is formed on both an outer surface and an inner surface of the tip plate 15.

Thus, the ridge 17 serves as a non-slip when the tip plate 15 is grasped, and operation is facilitated.

The bridge 22 is arranged in a position spaced outward from the outer surface of the divided cover 2B.

Thus, the tip piece 12 of the first locking part 10 is easily inserted into the inside of the bridge 22.

The protrusion 23 protruding outward is provided on the outer surface of the bridge 22.

Thus, when the cover 1 is removed, the bridge 22 can be elastically deformed in a direction away from the locking groove 13 using the protrusion 23, and the locking and releasing operations of the first locking part 10 and the second locking part 20 are easily performed.

The distance L1 from the outer surface of the divided cover 2A to the protruding end of the tip piece 12 in the direction intersecting the abutment direction D is less than the distance L2 from the outer surface of the divided cover 2B to the tip of the protrusion 23 in the direction intersecting the abutment direction D.

Thus, the tip plate 15 is less likely to hinder an operation of the protrusion 23.

The inner layer 4 made of urethane foam is arranged on a portion of the inner surface of the divided covers 2A and 2B.

Thus, a sound insulation effect when covering the object M is enhanced.

A modification of the present disclosure will be described below.

In the above embodiment, the first locking part is provided on both edges of one divided cover, and the second locking part is provided on both edges of the other divided cover. However, the present disclosure is not limited thereto. For example, the first locking part may be provided on one edge of each divided cover and the second locking part may be provided on the other edge, and the first locking part and the second locking part facing each other may be locked.

The number of locking parts provided on an edge is not limited to two, and may be three or more, or may be one.

In the first locking part, the shape or number of ridges provided on the tip piece is not limited to the above embodiment. The ridge may not be provided on both front and back surfaces of the tip piece and may only be provided on either surface. The ridge may be omitted.

In the above embodiment, the distance to the protruding end of the tip plate in the direction orthogonal to the abutment direction is less than the distance to the tip of the protrusion. However, these distances may be equal to each other.

In the second locking part, the shape or number of protrusions is not limited to the above embodiment. The protrusion may be of a shape in which the upper ends are connected. The protrusion may be omitted.

In the above embodiment, the cover body has a structure including a pair of divided covers. However, the cover body may include three or more divided covers. Conversely, there may be one cover body. That is, any structure may be used if it has a pair of edges facing each other and is joined by locking between the first locking part and the second locking part.

The shape of the cover as a whole is not limited to a cylindrical shape, and can be changed as appropriate in accordance with the shape of the object.

Figure 7:
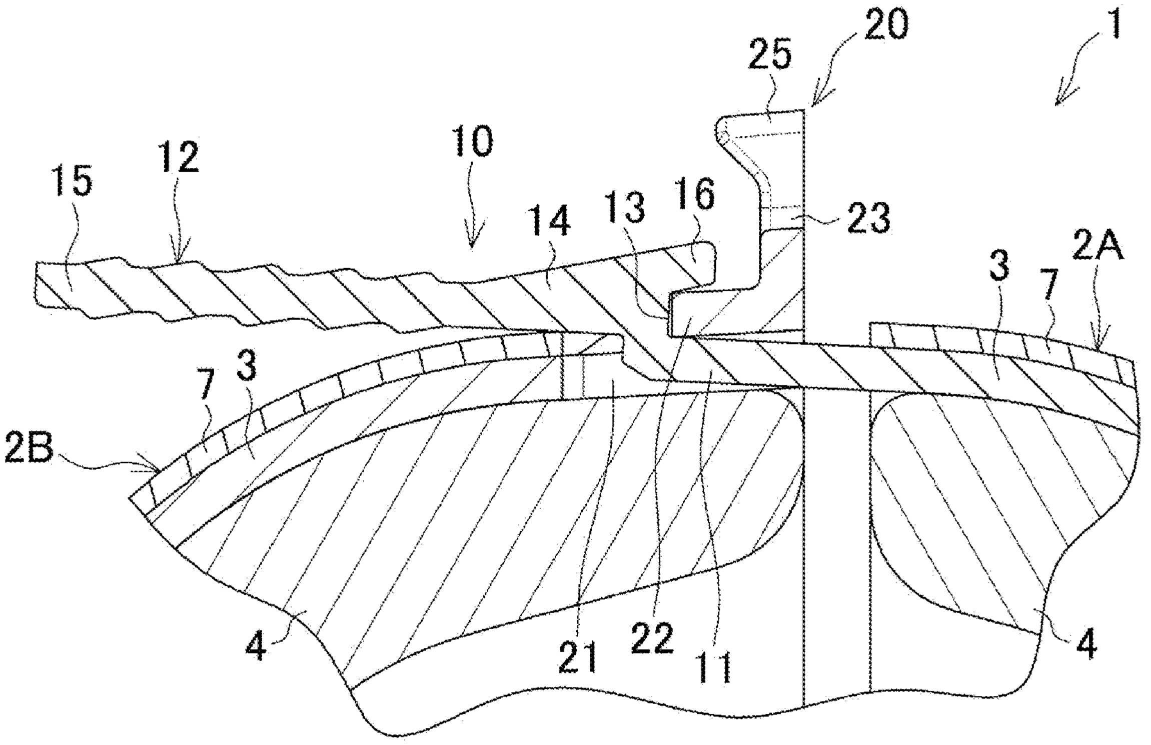
FIG. 7 is a cross-sectional view showing a modification of the cover.

In the above embodiment, the inner layer made of urethane foam is formed inside each divided cover. However, as shown in FIG. 7, a covering layer 7 made of urethane foam may be formed on a portion of or the whole of a surface of the outer layer 3.

If the covering layer 7 made of a sound insulating material is arranged on at least a portion of the outer surface of the divided covers 2A and 2B in this way, a relatively good sound insulation effect may be achieved.

The inner layer and/or the covering layer is not necessarily made of urethane foam, and may be made of other foamed resins.

The invention claimed is:

1. A cover, comprising:

a cover body, made of an elastomer and having a pair of edges facing each other;

a first locking part, integrally formed on one of the edges; and a second locking part, integrally formed on the other of the edges, wherein the cover is able to cover an object by locking the first locking part and the second locking part to each other with the edges facing each other abutted against each other;

the first locking part comprises a base end piece protruding in an abutment direction from the one of the edges to the other of the edges and a tip piece protruding in the abutment direction from a protruding end of the base end piece, and has a locking groove opening on a side opposite to the abutment direction formed between the base end piece and the tip piece;

the second locking part comprises a notch formed in the abutment direction from the other of the edges, and a bridge formed along the other of the edges so as to straddle the notch on an outer surface side of the cover body, and an insertion hole communicating with the notch is formed inside the bridge; and by inserting the tip piece and the base end piece through the insertion hole and locking the bridge to the locking groove, the first locking part is locked to the second locking part while being prevented from coming off, wherein the tip piece comprises:

a locking plate, connected to the base end piece; and a tip plate, connected to the locking plate;

wherein the locking plate comprises: a protruding portion that protrudes toward the side opposite to the abutment direction, the locking groove is formed between the base end piece and the protruding portion, the tip plate is connected to the locking plate while being inclined outward at a predetermined inclination angle in a direction intersecting the abutment direction.

2. The cover according to claim 1, wherein the inclination angle of the tip plate with respect to the locking plate is 5° to 30°.

3. The cover according to claim 2, wherein a ridge is formed on at least one of an outer surface and an inner surface of the tip plate.

4. The cover according to claim 1, wherein the bridge is arranged in a position spaced outward from the outer surface of the cover body.

5. The cover according to claim 1, wherein a protrusion protruding outward is provided on an outer surface of the bridge.

6. The cover according to claim 5, wherein a distance from the outer surface of the cover body to a protruding end of the tip piece in a direction intersecting the abutment direction is equal to or less than a distance from the outer surface of the cover body to a tip of the protrusion in the direction intersecting the abutment direction.

7. The cover according to claim 1, wherein a sound absorbing material formed from foamed resin is arranged on at least a portion of an inner surface of the cover body.

8. The cover according to claim 7, wherein the sound absorbing material is also arranged on at least a portion of the outer surface of the cover body.

* * * * *